United States Patent
Killingbeck et al.

(10) Patent No.: US 9,500,463 B2
(45) Date of Patent: Nov. 22, 2016

(54) ROTATING BORE SPRAYER ALIGNMENT INDICATOR ASSEMBLY

(71) Applicant: Caterpillar Inc., Peoria, IL (US)

(72) Inventors: Jeremy J. Killingbeck, Greenwood, IN (US); Donald L. Marrs, Jr., Franklin, IN (US)

(73) Assignee: Caterpillar Inc., Peoria, IL (US)

( * ) Notice: Subject to any disclaimer, the term of this patent is extended or adjusted under 35 U.S.C. 154(b) by 294 days.

(21) Appl. No.: 14/446,078

(22) Filed: Jul. 29, 2014

(65) Prior Publication Data

US 2016/0033267 A1    Feb. 4, 2016

(51) Int. Cl.
  *G01B 5/25*    (2006.01)

(52) U.S. Cl.
  CPC ........................................ *G01B 5/25* (2013.01)

(58) Field of Classification Search
  CPC ...................................................... G01B 21/24
  USPC .................................................... 33/613, 645
  See application file for complete search history.

(56) References Cited

U.S. PATENT DOCUMENTS

| | | | |
|---|---|---|---|
| 4,208,157 A | 6/1980 | Guarino et al. | |
| 4,336,656 A | 6/1982 | Lewis | |
| 5,296,667 A | 3/1994 | Marantz et al. | |
| 5,468,295 A | 11/1995 | Marantz et al. | |
| 5,624,586 A * | 4/1997 | Sobr | H05H 1/34 219/121.48 |
| 5,704,132 A | 1/1998 | Borne | |
| 5,796,064 A | 8/1998 | Rice | |
| 5,820,938 A | 10/1998 | Pank et al. | |
| 5,922,412 A | 7/1999 | Baughman et al. | |
| 5,938,944 A | 8/1999 | Baughman et al. | |
| 5,958,520 A | 9/1999 | Cook et al. | |
| 6,651,843 B2 | 11/2003 | Kowalsky et al. | |
| 6,863,931 B2 | 3/2005 | Someno et al. | |
| 6,888,093 B2 * | 5/2005 | Hardwick | H05H 1/34 219/121.48 |
| 6,946,617 B2 * | 9/2005 | Brandt | H05H 1/28 219/121.49 |
| 8,471,182 B2 | 6/2013 | Stauffer et al. | |
| 8,581,138 B2 | 11/2013 | Kowalsky et al. | |
| 8,766,134 B2 * | 7/2014 | Mather | B23K 9/013 219/121.39 |
| 2013/0000550 A1 | 1/2013 | Brown et al. | |
| 2014/0004255 A1 | 1/2014 | Whitbeck | |
| 2016/0033267 A1 * | 2/2016 | Killingbeck | G01B 5/25 33/645 |

FOREIGN PATENT DOCUMENTS

JP    4497086 B2    9/2006

* cited by examiner

*Primary Examiner* — Yaritza Guadalupe-McCall
(74) *Attorney, Agent, or Firm* — Miller, Matthias & Hull LLP

(57) ABSTRACT

An alignment assembly for a rotating thermal sprayer may include an elongated alignment base that connects at one end to a sprayer positioning assembly connection mechanism, and an indicator device disposed at the opposite end of the alignment base and rotating about a sprayer rotational axis defined by the sprayer positioning assembly. The indicator device may have a visual indicator operatively connected to a stylus so that a display of the visual indicator changes when the stylus moves relative to a stylus neutral position. The sprayer positioning assembly may position the stylus in contact with a concave surface that will be coated, such as an engine bore, and the indicator device rotated about the sprayer rotational axis to determine whether display of the visual indicator changes to indicate if the sprayer rotational axis is aligned with a longitudinal axis of the concave surface.

20 Claims, 6 Drawing Sheets

ROTATING BORE SPRAYER ALIGNMENT INDICATOR ASSEMBLY

TECHNICAL FIELD

The present disclosure relates generally to the application of thermal spray coatings to concave surfaces such as cylindrical bores in engine blocks, and more particularly, to apparatus and methods for aligning a thermal bore spray torch with a longitudinal axis of a concave surface to be coated by the torch.

BACKGROUND

Thermal spraying processes are employed in various industries to apply protective coatings to surfaces of components that will be subjected to harsh operating conditions, such as high temperatures and impaction by abrasive materials. In these thermal spraying processes, the coating materials are melted or vaporized, and sprayed onto the substrate surface that is to be coated. Typically, a "feedstock" material in wire or powdered form is heated by an electrical means, such as plasma or arc, or a chemical means, such as a combustion flame, to a molten or semi-molten state, and accelerated toward the substrate surface by a plasma gas jet and/or another high pressure air jet. Thermal spraying processes are superior to other coating processes such as electroplating because the substrates may be covered with a relatively thick coating over a large surface area in a shorter processing time.

Plasma transferred wire arc (PTWA) thermal spraying is one type of thermal spraying process for depositing a coating of the feedstock material to both external and internal substrate surfaces. PTWA thermal spraying is particularly applicable for use in coating the concave inner surfaces of the cylinder bores of internal combustion engines. Heat and abrasion resistant coatings on the cylinder bores enable the use of aluminum engine blocks without the need for heavy cast iron sleeves as are otherwise required to withstand the heat generated during the combustion cycle. In many PTWA bore spray torches, a single conductive wire is used as the feedstock for the system. A supersonic plasma jet formed by a transferred arc between a non-consumable cathode and the feedstock wire melts and atomizes the wire, and an additional forced gas jet transports the stream of molten droplets onto the surface the cylinder bore as the torch rotates within the cylinder bore to apply an even coating to the entire surface.

PTWA bore spray torches in various forms are known in the art. For example, U.S. Pat. No. 5,296,667, issued to Marantz et al. on Mar. 22, 1994, and entitled "High Velocity Electric-Arc Spray Apparatus and Method of Forming Materials," teaches a torch assembly employed in a manner suitable for depositing a uniform coating on the surface of a concave surface such as a bore. The torch assembly is mounted on a rotating member to allow rotation concentrically with respect to the bore by means of a motor drive. At the opposite end, the rotating member is mounted on a stationary end plate and formed with an insulating wire feed conduit extending through its rotation axis. The torch assembly is mounted on the radius of the rotating member so that a plasma jet extends toward the insulating wire feed conduit. A wire is fed on the central axis of the bore through the wire feed conduit, and gas and electrical connections to the torch assembly are brought through the stationary end plate to and through the rotating member to the torch assembly. A transferred-arc plasma melts off the tip of the wire as it is continuously fed into the plasma jet, and the molten droplets are atomized and propelled by the plasma stream towards the inner wall of the bore. As the rotating member and the transferred-arc plasma torch assembly are rotated, a coating is deposited uniformly on the wall of the bore. While the deposit is being formed by the rotational movement, the assembly is reciprocated axially within the bore to cause the deposit to form all along the circumference of the bore as well as the length of the bore.

In another example, U.S. Pat. No. 5,468,295, issued to Marantz et al. on Nov. 21, 1995 and entitled, "Apparatus and Method for Thermal Spray Coating Interior Surfaces," discloses a method of thermal spray coating a surface with a metal coating material including the provision of a nozzle about a thermal spray coating apparatus, such as a two wire electric-arc apparatus. The nozzle includes a plurality of ports facing generally radially inwardly towards a coating material particle stream, such as an atomized molten metal stream of a two-wire arc thermal spray apparatus. The ports sequentially receive a deflecting gas flow, such that the direction moves circumferentially about the axis of the particle stream. The deflecting gas entrains the coating material and carries it radially to the surface of the part to be coated or the nozzle assembly. The plurality of valve ports allows for coating of a cylindrical surface without rotating the end of the assembly. A method and apparatus for simultaneously coating a plurality of bores of a main body, such as an engine block, includes a plurality of deflecting nozzles which are simultaneously inserted in each of the bores.

To ensure even and complete coating of the interior surfaces of the cylindrical bores, the torch assembly and the nozzles in the exemplary patents, as well as other similar arrangements where rotation of a sprayer or a spray about a rotational axis occurs, coincidental alignment of the rotational axis with a longitudinal axis of the bore allows the sprayer to deposit an even and complete coating over the interior surface. Once the relative positions and alignments of the sprayer and the cylindrical bores are established, the sprayer may be repetitively inserted into the bores as the engine blocks travel past the spraying station on the production line or are otherwise cycled through the spraying station. From time to time, however, it is necessary to reestablish the spatial relationship between the sprayer and the cylindrical bores. For example, the alignment may be compromised when the sprayer hits an engine block or other obstruction, or when the sprayer must be removed from the assembly for maintenance or replacement. At present, no robust mechanism or method exists for aligning these types of sprayers to the part that is being sprayed. Without proper alignment, the surface may not be properly coated, and excessive defects can occur such as hot spots at the ends of the bores with insufficient coatings to withstand the heat generated and the abrasions occurring during the combustion cycle. In view of this, a need exists for an improved apparatus and method for aligning a sprayer with a bore or other concave surface to be coated as the sprayer rotates about its rotational axis.

SUMMARY OF THE DISCLOSURE

In one aspect of the present disclosure, a sprayer alignment assembly for aligning a sprayer rotational axis of a rotating sprayer with a bore longitudinal axis of a concave surface is disclosed. The rotating sprayer may mount on a sprayer positioning assembly that moves the rotating sprayer relative to the concave surface. The sprayer alignment assembly may include an elongated alignment base having a first end and an oppositely disposed second end, an alignment base connection mechanism disposed at the first end of the elongated alignment base and configured to engage a sprayer positioning assembly connection mechanism and align an alignment base longitudinal axis along the sprayer rotational axis defined by the sprayer positioning assembly, and an indicator device disposed at the second end of the elongated alignment base and rotating about the sprayer rotational axis when the elongated alignment base is attached to the sprayer positioning assembly. The indicator device may have a visual indicator and a stylus operatively connected to the visual indicator such that a display of the visual indicator changes when the stylus moves relative to a stylus neutral position.

In another aspect of the present disclosure, a method for aligning a rotating sprayer with a concave surface is disclosed. The method may include detaching the rotating sprayer from a sprayer positioning assembly, attaching a sprayer alignment assembly to the sprayer positioning assembly, wherein the sprayer alignment assembly comprises an indicator device having a visual indicator and a stylus operatively connected to the visual indicator such that a display of the visual indicator changes when the stylus moves relative to a stylus neutral position, and moving the sprayer positioning assembly to a first longitudinal position relative to the concave surface wherein the stylus of the indicator device is in contact with the concave surface. The method may further include rotating the indicator device about a sprayer rotational axis defined by the sprayer positioning assembly, determining whether the display of the visual indicator changes as the indicator device rotates about the sprayer rotational axis due to movement of the stylus relative to the stylus neutral position, and changing a position of the sprayer positioning assembly in a direction to more closely align the sprayer rotational axis with a concave surface longitudinal axis in response to determining that the display of the visual indicator changed during rotation of the indicator device about the sprayer rotational axis.

In another aspect of the present disclosure, a sprayer alignment assembly for aligning a sprayer rotational axis of a rotating sprayer with bore longitudinal axis of a concave surface is disclosed. The rotating sprayer may mount on a sprayer positioning assembly that moves the rotating sprayer relative to the concave surface. The sprayer alignment assembly may include an elongated alignment base having a first end and an oppositely disposed second end, an indicator base connection mechanism disposed at the first end of the elongated alignment base and configured to engage a sprayer positioning assembly connection mechanism and align an alignment base longitudinal axis along the sprayer rotational axis defined by the sprayer positioning assembly, and an indicator device disposed at the second end of the elongated alignment base. The indicator device may be configured to determine a radial distance between the sprayer rotational axis and the concave surface at multiple positions about the sprayer rotational axis, and to provide a sensory perceptible output of changes in the radial distance at the multiple positions about the sprayer rotational axis.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
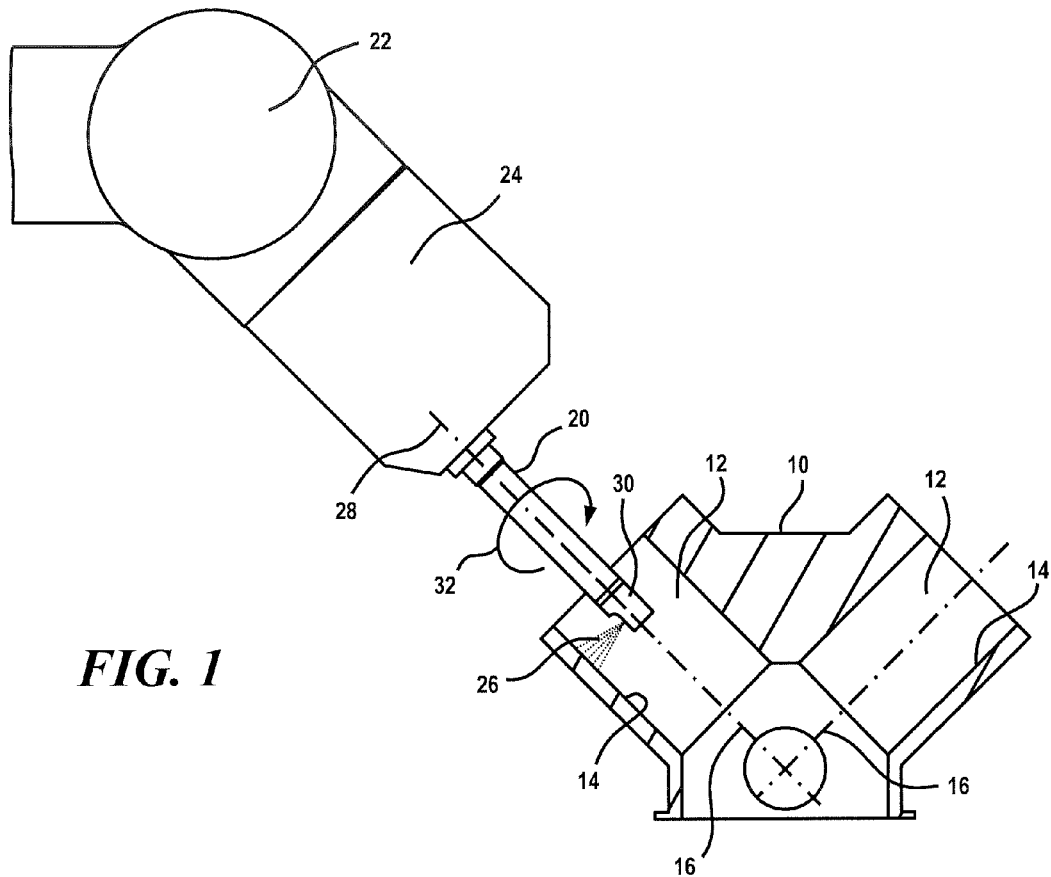
FIG. 1 is a side view of a rotating sprayer applying a thermal spray coating to a concave inner surface of a cylindrical bore of an engine block.

FIG. 1 provides an exemplary arrangement for applying a thermal spray coating to a concave surface. In the example, an engine block 10 includes a plurality of cylindrical engine bores 12 having concave inner surfaces 14. Each bore 12 and corresponding concave inner surface 14 is symmetrical about a bore longitudinal axis 16. Coatings are applied to the concave surfaces 14 by a rotating sprayer 20 that is inserted into and retracted from the cylindrical bores 12 by a sprayer positioning assembly 22 having a rotary drive 24 to which the rotating sprayer 20 is attached.

The rotating sprayer 20 may be a PTWA bore spray torch, such as that manufactured and marketed by Flame-Spray Industries of Port Washington, N.Y., or any other appropriate thermal spray device for providing a sprayer output 26 about 360° of rotation to evenly and completely coat a concave surface. Sprayer positioning assembly 22 may be any appropriate manual or automated mechanism for orienting, positioning and moving the rotating sprayer 20 relative to the concave surface 14 to be coated. For example, the sprayer positioning assembly 22 may be a robotic arm controlled by operator controls or operational software for affecting movement of the rotating sprayer 20 relative to the concave surface 14. Such controls or software may control the rotary drive 24 to rotate the rotating sprayer 20 about a sprayer rotational axis 28 defined by the rotary drive 24, and control the rotating sprayer 20 to generate the sprayer output 26 when the rotating sprayer 20 is disposed within one of the engine bores 12.

During the coating process, the engine bores 12 to be coated are moved into and out of position for spraying at a spraying station. When a bore 12 is in position, the sprayer rotational axis 28 is substantially coincidentally aligned with the bore longitudinal axis 16, and the rotating sprayer 20 is moved longitudinally into the bore 12. A spray end 30 of the rotating sprayer 20 moves longitudinally into and out of the bore 12 as the rotary drive 24 rotates the sprayer 20 as indicated by an arrow 32 so that the sprayer output 26 evenly and completely coats the entire concave surface 14 of the bore 12. After the surface 14 is coated, the rotating sprayer 20 is withdrawn from the bore 12 and the engine block 10 is repositioned or a new engine block 10 is moved into position in the spraying station so that the next cylindrical bore 12 can be coated.

Figure 2:
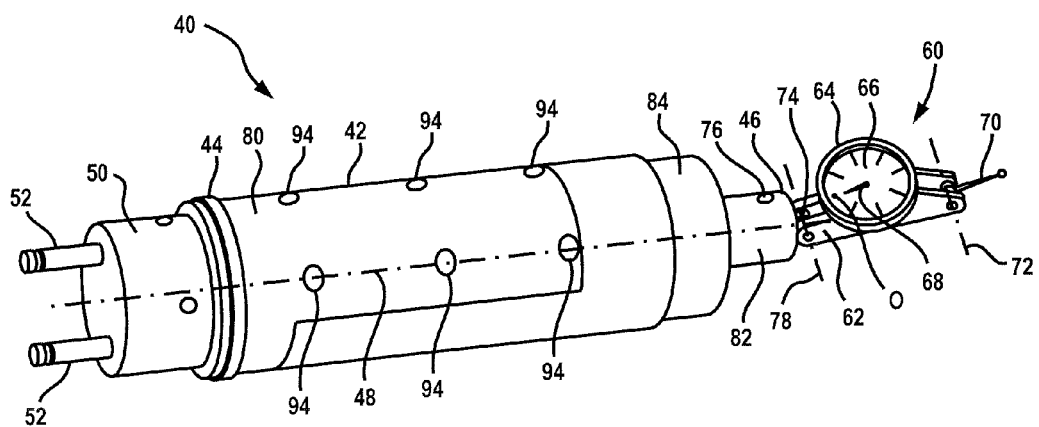
FIG. 2 is a perspective view of a sprayer alignment assembly in accordance with the present disclosure.

As discussed above, the rotating sprayer 20 may hit an obstruction and become misaligned, or may require removal for performance of maintenance or replacement of parts. In these situations, the sprayer positioning assembly 22 must be realigned so that the sprayer rotational axis 28 again will align with the bore longitudinal axis 16. To facilitate more reliable alignment of the sprayer rotational axis 28 and reduction in coating defects, a sprayer alignment assembly 40 in accordance with the present disclosure as illustrated in FIG. 2 is provided to reliably align the axes 16, 28. The sprayer alignment assembly 40 may include an elongated alignment base 42 that is generally cylindrical. The alignment base 42 may have a first end 44 and an oppositely disposed second end 46 separated by a longitudinal length along an alignment base longitudinal axis 48.

At the first end 44, the alignment base 42 may include an alignment base connection mechanism 50 configured to be received in and engaged by a corresponding connection mechanism (not shown) of the rotary drive 24. When the sprayer alignment assembly 40 is connected to the rotary drive 24, the alignment base longitudinal axis 48 may be coincident with the sprayer rotational axis 28 defined by the rotary drive 24. The alignment base connection mechanism 50 may have a similar configuration as a connection mechanism (not shown) of the rotating sprayer 20 so that the sprayer alignment assembly 40 attaches to the rotary drive 24 in a similar manner. Consequently, the alignment base connection mechanism 50 may have a pair of stems or arms 52 extending longitudinally to match corresponding extensions (not shown) of the rotating sprayer connection mechanism that may provide fluid passages for plasma gas and carrier gas that are used to form the sprayer output 26 at the spray end 30. Alternative alignment base connection mechanisms 50 may be provided with the sprayer alignment assembly 40 so that the alignment base longitudinal axis 48 is aligned with the sprayer rotational axis 28 when the sprayer alignment assembly 40 is connected to the rotary drive 24.

At the second end 46 of the alignment base 42, the alignment base 42 is configured for connection of an indicator device 60 that will provide a visual indication of the alignment of the sprayer rotational axis 28 with the bore longitudinal axis 16 as will be described more fully hereinafter. The indicator device 60 is illustrated is an Interapid® dial test indicator that is known to those skilled in the art. However, alternative indicator devices may be used as will be discussed further below. The indicator device 60 as illustrated may have an indicator device body 62 supporting a visual indicator or display 64 such as a dial 66 having a rotatable needle 68 that rotates relative to a face of the dial 66. The rotatable needle 68 may be operatively connected to a test arm or stylus 70 that is pivotally connected to the indicator device body 62 to rotate about a stylus rotational axis 72. The stylus 70 may have a normal neutral position as shown in FIG. 2 at which the rotatable needle 68 points to a zero or neutral position O on the face of the dial 66. When the stylus 70 rotates in either direction about the stylus rotational axis 72 when the stylus 70 engages a work piece or surface, the needle 68 rotates in response in the clockwise or counterclockwise direction by an amount corresponding to the rotation of the stylus 70 to provide an indication of the proximity of the engaged surface to the indicator device 60.

The indicator device 60 may be connected to the second end 46 of the alignment base 42 by a support arm 74 (FIG. 3) that is received in a corresponding opening (not shown) in the second end 46, and may be secured therein by an appropriate mechanism such as a set screw 76. The support arm 74 may be rotatably connected to the indicator device body 62 so that the indicator device body 62 may rotate relative to the alignment base 42 about an indicator device rotational axis 78 that is perpendicular to the alignment base longitudinal axis 48. The support arm 74 may be aligned along the alignment base longitudinal axis 48 or otherwise positioned so that the indicator device 60 rotates about the alignment base longitudinal axis 48 and, correspondingly the sprayer rotational axis 28 when the sprayer alignment assembly 40 is connected to the rotary drive 24.

Figure 3:
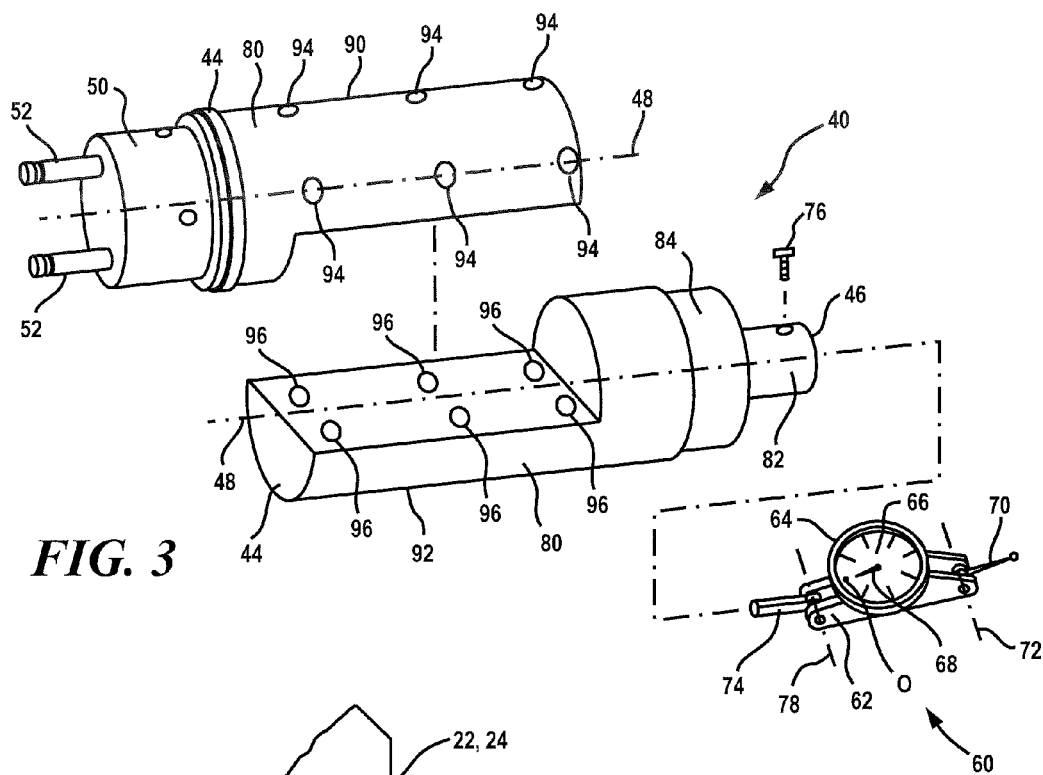
FIG. 3 is an assembly view of the sprayer alignment assembly of FIG. 1.

As shown in FIGS. 2 and 3, the alignment base 42 may have a first base portion 80 having a first base portion outer diameter extending from the first end 44 toward the second end 46, and a second base portion 82 extending from the second end 46 toward the first end 44 and having a second portion outer diameter that is less than the first portion outer diameter. The larger first portion outer diameter may correspond to an outer diameter of the rotating sprayer 20 and its connection mechanism, while the smaller second portion outer diameter may facilitate free rotation of the indicator device 60 about the indicator device rotational axis 78 and visibility of the visual indicator 64 when the indicator device 60 is disposed within an engine bore 12 during alignment as discussed further below. The alignment base 42 may further include an intermediate base portion 84 disposed longitudinally between the first base portion 80 and the second base portion 82. The intermediate base portion 84 may have an intermediate base portion outer diameter that is less than the first portion outer diameter and greater than the second portion outer diameter to provide additional visibility of the visual indicator 64 and clearance from the concave surface 14 of the engine bore 12 to prevent inadvertent contact with the engine block 10 during alignment.

As shown in FIG. 3, in some embodiments the alignment base 42 may have a two-piece construction, and may be formed from a first half cylinder 90 and a second half cylinder 92 that may be bolted, welded or otherwise connected to form the alignment base 42. The first half cylinder 90 may be fabricated from a body of a rotating sprayer 20 that has been cut down to form the first half cylinder 90 with half of the first base portion 80 and the first end 44 having the alignment base connection mechanism 50 that will match the connection mechanism of the rotary drive 24. The second half cylinder 92 may be fabricated from a separate piece of metal stock, and include the second base portion 82, the intermediate base portion 84 and the second half of the first base portion 80. In the illustrated embodiment, the half cylinders 90, 92 are brought into alignment with screw holes 94 of the first half cylinder 90 aligned with corresponding screw holes 96 of the second half cylinder 92, and screws (not shown) installed there through to secure the half cylinders 90, 92 together. In many applications, the alignment base 42 may be formed as a single unitary component, such as a solid piece machined from aluminum or other appropriate material, or may be formed from two or more pieces depending on the needs of a particular thermal spray implementation, fabrication technology, material properties and the like.

Figure 4:
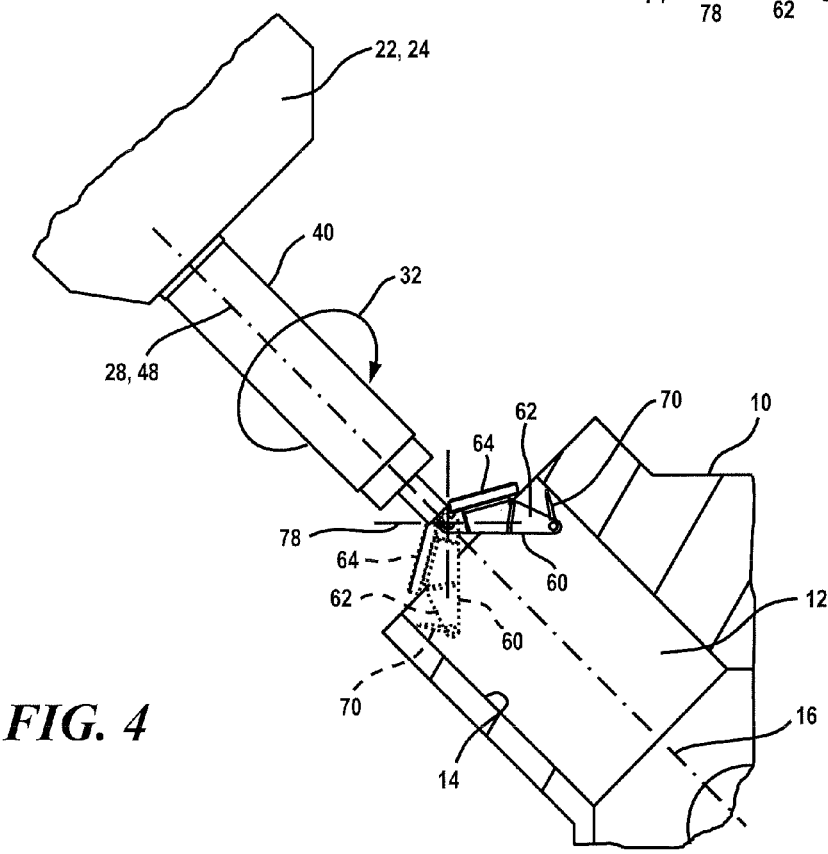
FIG. 4 is a side view of the sprayer alignment assembly of FIG. 2 installed on the sprayer positioning assembly of FIG. 1 and evaluating an alignment of a sprayer rotational axis with a bore longitudinal axis.
Figure 5:
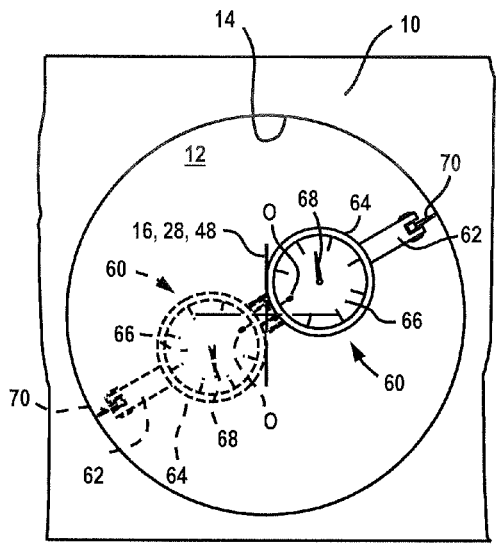
FIG. 5 is a view looking into a cylindrical bore of FIG. 4 along the bore longitudinal axis and showing multiple positions of an indicator device.

FIG. 4 illustrates the sprayer alignment assembly 40 connected to the rotary drive 24 of the sprayer positioning assembly 22. With the alignment base 42 attached by the alignment base connection mechanism 50 to the rotary drive 24, the alignment base longitudinal axis 48 is coincident with the sprayer rotational axis 28. The alignment base 42 may have a longitudinal length from the first end 44 to the second end 46 such that a connection point of the support arm 74 of the indicator device 60 to the second end 46 of the alignment base 42 is disposed approximately at a location of the sprayer output 26 when the rotating sprayer 20 is attached to the sprayer positioning assembly 22. To begin the alignment process, the indicator device 60 may be rotated about the indicator device rotational axis 78 to a position wherein the stylus 70 will engage the concave surface 14 and the visual indicator 64 will be visible to the operator. With the indicator device 60 positioned relative to the alignment base 42, the sprayer positioning assembly 22 may move the indicator device 60 to a first longitudinal position within the engine bore 12 as shown in solid lines in FIG. 4. The stylus 70 engages the concave surface 14 of the bore 12 and rotates from its neutral position. The movement of the stylus 70 is translated to the rotatable needle 68 which rotates on the dial 66 away from its neutral or zero position O as seen in the visual indicator 64 shown in solid lines in FIG. 5.

In this example, the sprayer rotational axis 28 and the alignment base longitudinal axis 48 are aligned with the bore longitudinal axis 16. When the axes 16, 28, 48 are aligned, the radial distance between the axes 28, 48 and the concave surface 14 is constant. As a result, the stylus 70 will maintain its position relative to the neutral position as the indicator device 60 rotates about sprayer rotational axis 28 two positions such as that shown in dashed lines in FIG. 4. This will be apparent to the operator as the needle 68 maintains its position on the dial 66 relative to the zero position O as the indicator device 60 rotates through 360° and positions such as that shown in dashed lines in FIG. 5.

It should be noted that the dial test indicator 60 illustrated and described herein is exemplary, and it is contemplated by the inventors to implement other devices capable of measuring a distance between the sprayer rotational axis 28 and the concave surface 14, and providing a visual or other sensory perceptible output of the distance to an operator. For example, the indicator device 60 may use any appropriate mechanical, electrical-mechanical, electrical, pneumatic or other measurement device capable of generating a signal indicative of a radial distance from the sprayer rotational axis 28 to the concave surface 14. Moreover, the visual indicator 64 may produce a visual, audible, tactile or other sensory perceptible output of the radial distance based on the signal from the measuring device using mechanical, electro-mechanical, electrical or other output technology. Still further, the output of a measurement device may be communicated to an external processing or display device to display the position information remotely from the indicator device 60 and the bore 12. Additional configurations of indicator devices 60 will be apparent to those skilled in the art and are contemplated by the inventors as having use in sprayer alignment assemblies 40 in accordance with the present disclosure.

Figure 7:
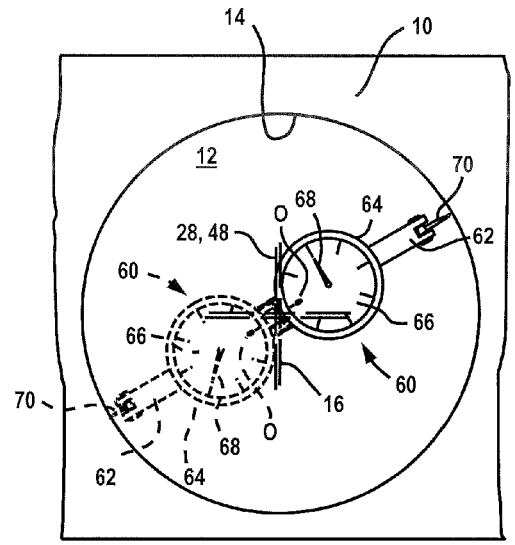
FIG. 7 is a view looking into a cylindrical bore of FIG. 6 along the bore longitudinal axis and showing multiple positions of an indicator device.
Figure 6:
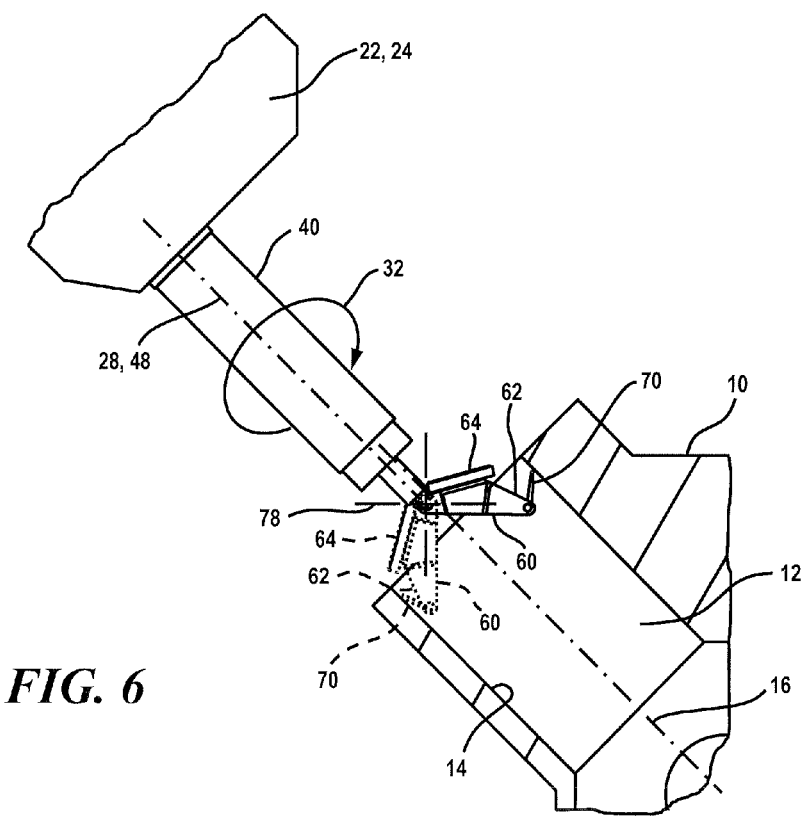
FIG. 6 is a side view of the sprayer alignment assembly of FIG. 2 installed on the sprayer positioning assembly of FIG. 1 and evaluating an alignment of a sprayer rotational axis with a bore longitudinal axis.

FIGS. 6 and 7 illustrate an alignment condition wherein the axes 28, 48 are parallel to but offset from the bore longitudinal axis 16. The indicator device 60 may be rotated to the desired position and inserted into the engine bore 12 with the stylus 70 engaging the concave surface 14. The needle 68 rotates from the zero position O on the dial 66 is shown in solid lines in FIG. 7. As the indicator device 60 is rotated about the sprayer rotational axis 28 as indicated by the arrow 32 in FIG. 6, the distance between the axes 28, 48 and the concave surface 14 changes, such as is shown by the indicator device 60 shown in dashed lines in FIGS. 6 and 7. In FIG. 7, the stylus 70 rotates further from the neutral position when the axes 28, 48 are closer to the concave surface 14. Correspondingly, the needle 68 rotates further on the dial 66 from the zero position O to indicate to the operator that the axes 28, 48 are not aligned with the bore longitudinal axis 16. In response, the operator can withdraw the indicator device 60 from the bore 12 and adjust the position of the sprayer alignment assembly 40 with the sprayer positioning assembly 22 by moving the axes 28, 48 toward the bore longitudinal axis 16 while maintaining their parallel relationship. After repositioning, the indicator device 60 may be reinserted into the bore 12 to determine if the axes 16, 28, 48 are now aligned.

Figure 8:
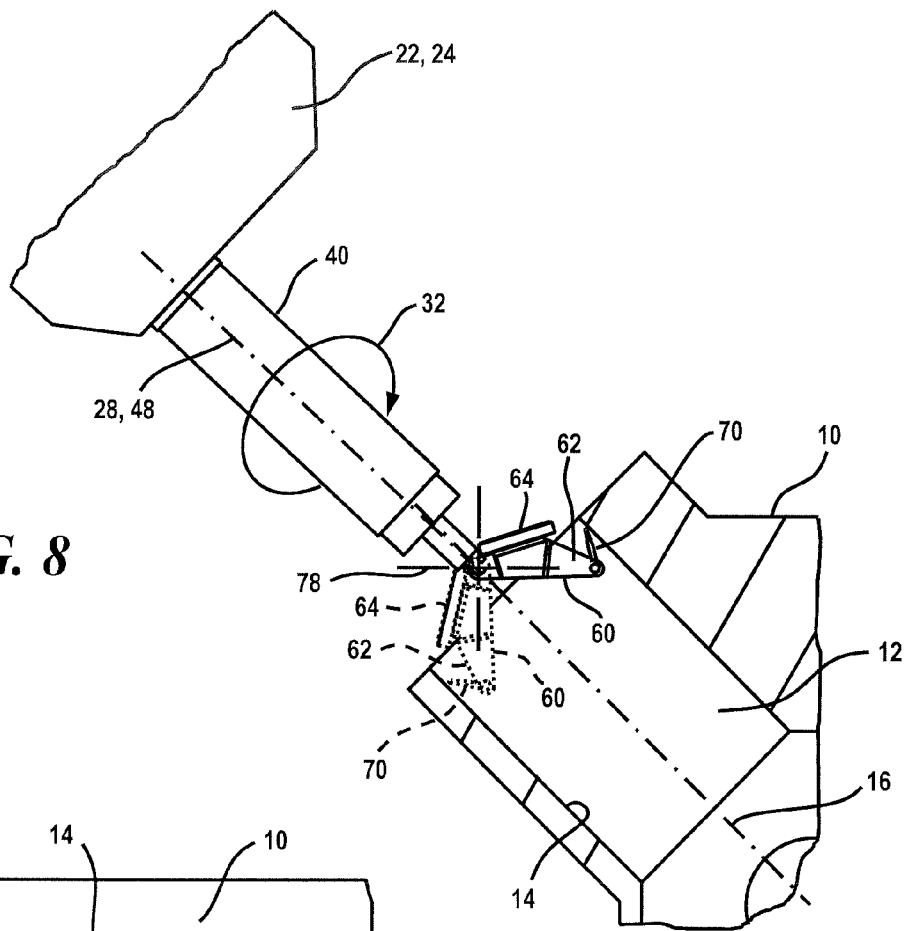
FIG. 8 is a side view of the sprayer alignment assembly of FIG. 2 installed on the sprayer positioning assembly of FIG. 1 and evaluating an alignment of a sprayer rotational axis with a bore longitudinal axis.
Figure 9:
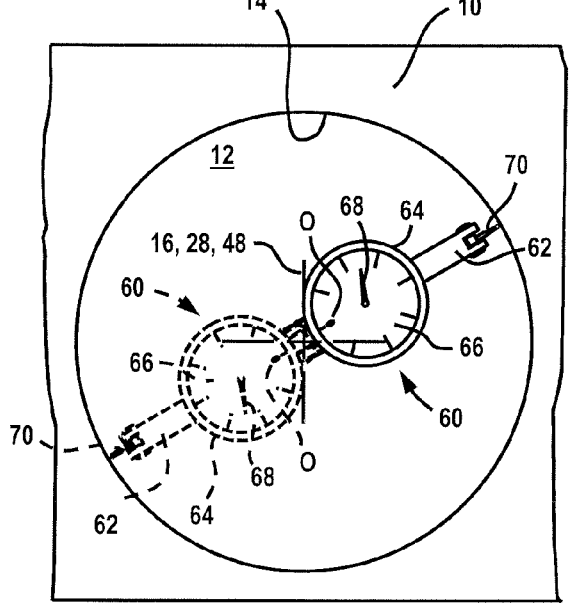
FIG. 9 is a view looking into a cylindrical bore of FIG. 8 along the bore longitudinal axis and showing multiple positions of an indicator device.

FIGS. 8-11 illustrate the alignment condition wherein the axes 28, 48 are not parallel to the bore longitudinal axis 16. In FIGS. 8 and 9, the indicator device 60 is inserted to the first longitudinal position within the engine bore 12. With this type of misalignment, the misalignment may be slight and the indicator device 60 could be positioned relative to the bore longitudinal axis 16 so that the distance from the axes 28, 48 as measured by the indicator device 60 does not change, or does not change by an amount that is perceptible by the operator with certainty from the visual indicator 64. Consequently, FIG. 9 may be similar to FIG. 5, with the stylus 70 and the needle 68 in substantially the same positions as the indicator device 60 is rotated about the axes 28, 48.

Figures 10, 11:
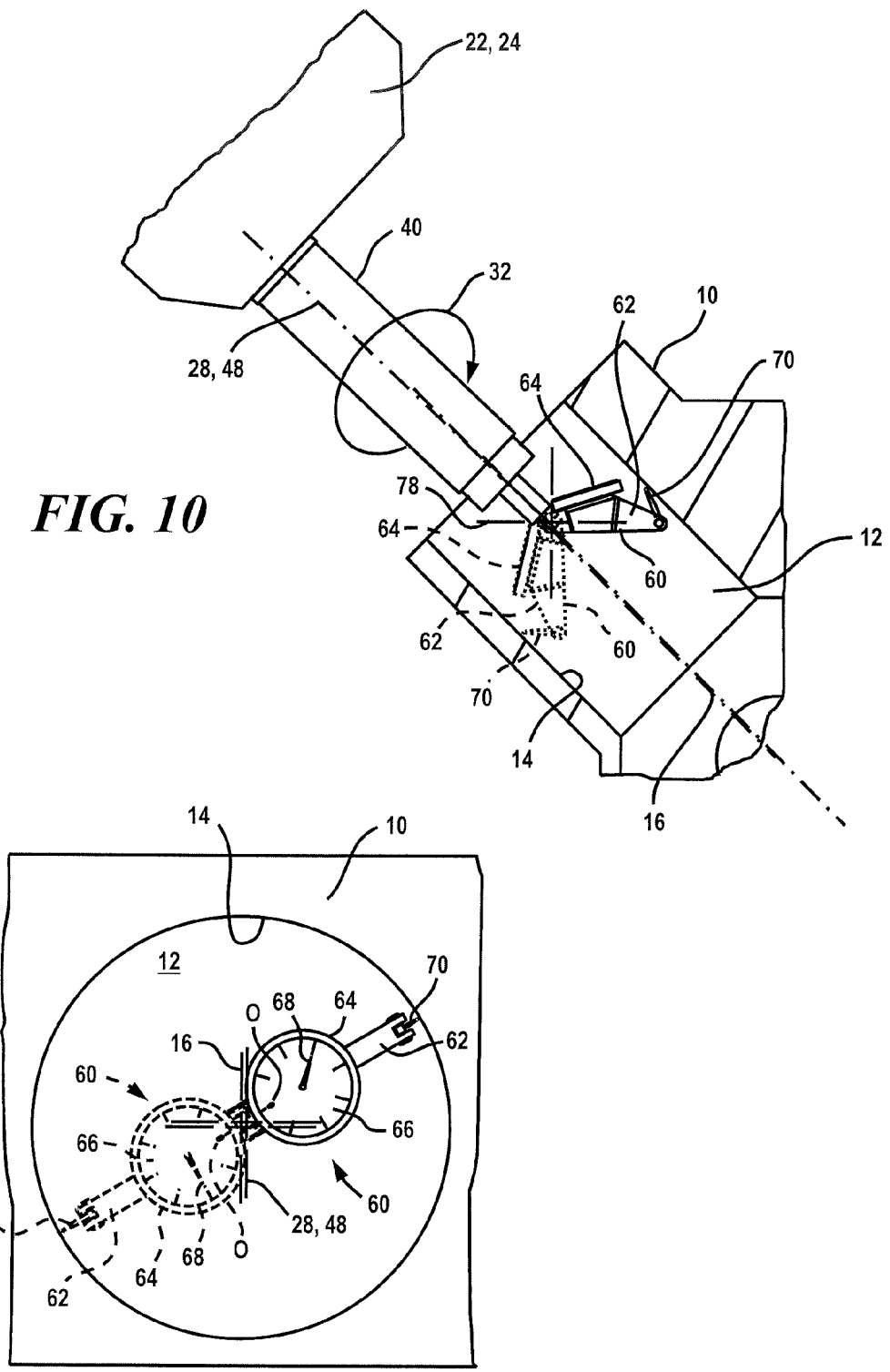
FIG. 10 is a side view of the sprayer alignment assembly of FIG. 2 installed on the sprayer positioning assembly of FIG. 1 and evaluating an alignment of a sprayer rotational axis with a bore longitudinal axis.
FIG. 11 is a view looking into a cylindrical bore of FIG. 10 along the bore longitudinal axis and showing multiple positions of an indicator device.

After not perceiving a change in the visual indicator 64, the operator may advance the indicator device 60 to a next longitudinal position as shown in FIGS. 10 and 11. Based on the particular misalignment, the indicator device 60 may detect that the axes 28, 48 are closer to the concave surface 14 when the indicator device 60 is in the position shown in solid lines than in the position shown in dashed lines. When the indicator device 60 is in the solid line position, the stylus 70 is rotated further from the neutral position than in FIGS. 8 and 9 as indicated by the position of the needle 68 relative to the zero position O in FIG. 11. As the indicator device 60 rotates to the dashed line position, the stylus 70 rotates back toward the neutral position and the needle 68 correspondingly rotates back by a perceptible amount toward the zero position O to communicate the misalignment to the operator. Based on the information, the operator may withdraw the indicator device 60 from the bore 12 and adjust the axes 28, 48 via the sprayer positioning assembly 22 by rotating the sprayer alignment assembly 40 toward parallel alignment of the axes 16, 28, 48. After the adjustment, the indicator device 60 may be repositioned to the first longitudinal position for subsequent evaluation of the alignment of the axes 16, 28, 48.

INDUSTRIAL APPLICABILITY

Figure 12:
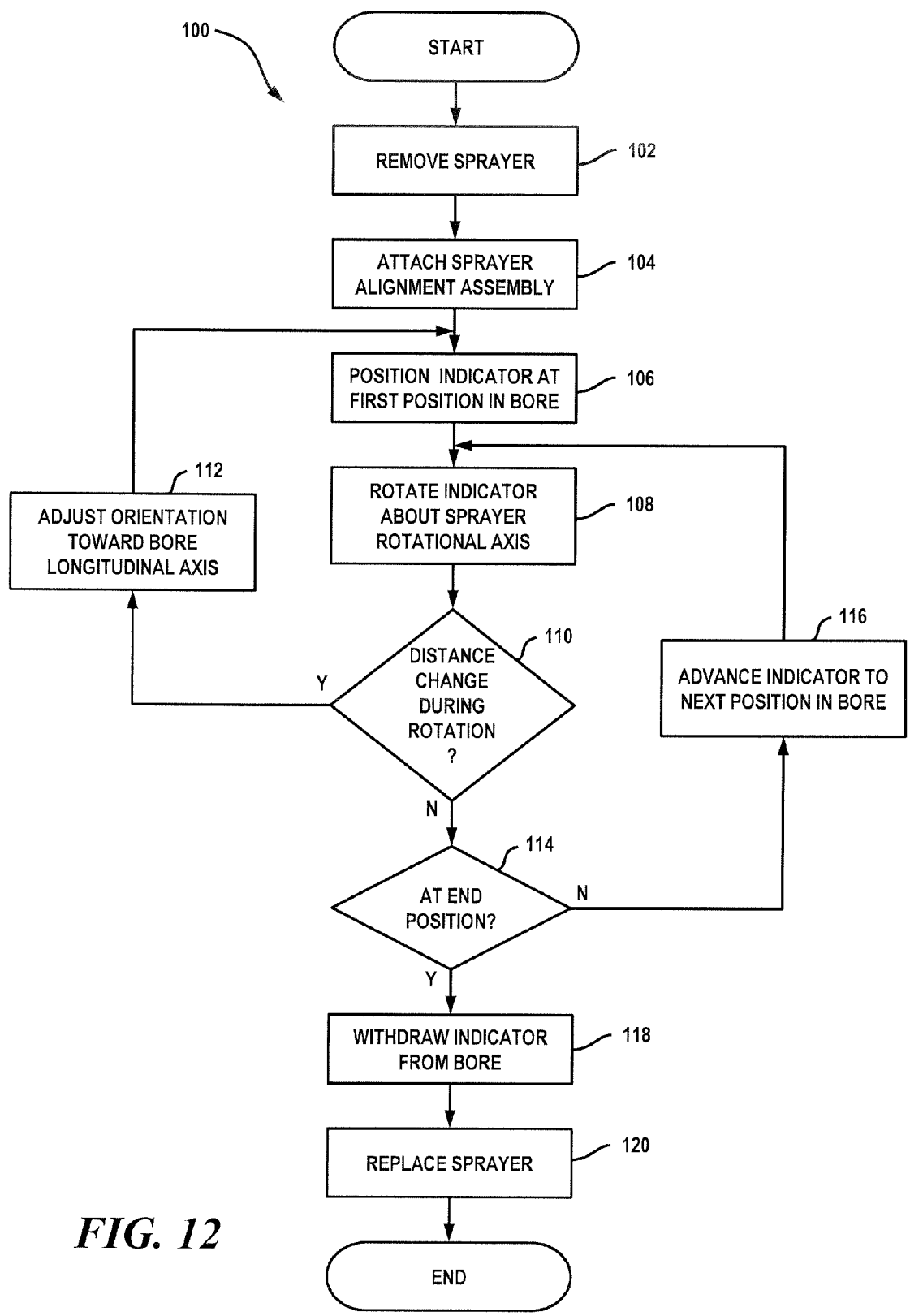
FIG. 12 is a flowchart of an exemplary rotating sprayer alignment routine that may be implemented using the sprayer positioning assembly of FIG. 1 and the sprayer alignment assembly of FIG. 2.

With assistance of the sprayer alignment assembly 40, the sprayer positioning assembly 22 may be reliably aligned with the bore longitudinal axes 16. Once aligned, the sprayer positioning assembly 22 can repetitively insert the rotating sprayer 20 within the concave surfaces 14 such as the engine bores 12, spray a uniform coating on the entire concave surface 14, and retract the rotating sprayer 20 after completion as the engine blocks 10 move along through or are inserted into the spraying station. FIG. 12 provides one exemplary rotating sprayer alignment routine 100 utilizing the sprayer positioning assembly 22 to position the sprayer alignment assembly 40. The routine 100 may begin at a block 102 where the rotating sprayer 20 is removed from the rotary drive 24 of the sprayer positioning assembly 22.

With the rotating sprayer 20 removed, the routine 100 passes to a block 104 where the sprayer alignment assembly 40 is attached to the rotary drive 24. With the alignment base connection mechanism 50 engaged by the connection mechanism of the rotary drive 24, the alignment base longitudinal axis 48 is aligned along the sprayer longitudinal axis 28 so that the indicator device 60 rotates about the sprayer rotational axis 28. When the connection mechanism 50 is fully engaged, control passes to a block 106 where the sprayer positioning assembly 22 moves the indicator device 60 to a first position within the cylindrical bore 12 as shown in FIGS. 4, 6 and 8. Depending on the nature of the sprayer positioning assembly 22, the movement may be performed manually by an operator, or the operator may manipulate the controls of an automated positioning assembly 22 to move the indicator device 60 relative to the engine block 10. If necessary, the indicator device 60 may be rotated about the indicator device rotational axis 78 to the appropriate position for engagement of the stylus 70 with the cylindrical service and visibility of the visual indicator 64 outside the cylindrical bore 12.

With the indicator device 60 at the first longitudinal position, the alignment of the axes 16, 28 can be evaluated. At a block 108, the indicator device 60 may be rotated about the sprayer rotational axis 28. Depending on the configuration of the sprayer positioning assembly 22 and the rotary drive 24, the sprayer positioning assembly 22 may be rotated manually, or the controls of the sprayer positioning assembly 22 may be operated to rotate the sprayer alignment assembly 40 about the sprayer rotational axis 28. As the indicator device 60 is rotated, the distance between the sprayer rotational axis 28 and the concave surface 14 of the bore 12 is indicated by the position of the needle 68 on the dial 66 relative to the zero position O.

The operator monitors the visual indicator 64 during the rotation of the sprayer alignment assembly 40 at a block 110 to determine if the axes 16, 28 are aligned. If the position of the needle 68 changes during rotation indicating a distance change between the sprayer rotational axis 28 and the concave surface 14, control passes to a block 112 where the operator will change the orientation of the sprayer positioning assembly 22 to more closely align the axes 28, 48 with the bore longitudinal axis 16. Depending on the situation, the orientation change may involve moving the sprayer positioning assembly 22 laterally without changing the angle of the alignment base longitudinal axis 48, with a change in the angle, or both. Typically, the indicator device 60 may be removed from the bore 12 before the adjustment, but removal is not necessarily required. After the adjustment is made, control may pass back to the block 106 where the indicator device 60 is repositioned at the first longitudinal position within the bore 12, and then to the block 108 where the indicator device 60 is again rotated about the sprayer rotational axis 28.

If the operator does not observe a distance change on the dial 66 at the block 110, control may pass to a block 114 to determine whether the indicator device 60 has been inserted into the bore 12 to a longitudinal end position. To ensure a complete coating of the concave surface 14, the rotating sprayer 20 must remain along the bore longitudinal axis 16 throughout its travel through the bore 12. As discussed in relation to FIGS. 8-11, the visual indicator 64 may not show a distance change when the indicator device 60 is in the first longitudinal position even though the axes 16, 28 are not coincident. Misalignment of the axes 16, 28 may not be evident until the indicator device 60 is inserted to a subsequent evaluation position such as that shown in FIGS. 10 and 11. Consequently, if the indicator device 60 is not at an end longitudinal position at the block 114, control may pass to a block 116 where the indicator device 60 is advanced to a next longitudinal position within the bore 12 and then rotated within the bore 12 at the block 108 so that a distance change can be evaluated at the block 110. As will be apparent from the flow of the routine 100, regardless of the current longitudinal position within the bore 12, the indicator device 60 may be reset to the first longitudinal position each time a distance change is detected at the block 110.

If a distance change is not detected at the block 110 and the indicator device 60 is disposed at the end longitudinal position at the block 114, then the sprayer longitudinal axis 28 is aligned with the bore longitudinal axis 16. At this point, control may pass to a block 118 where the indicator device 60 may be withdrawn from the bore 12 by moving the sprayer positioning assembly 22 longitudinally along the sprayer longitudinal axis 28. Whether mechanical or automated, the sprayer positioning assembly 22 may be configured to move along the bore longitudinal axis 16 and maintain alignment of the axes 16, 28. In some implementations, the sprayer positioning assembly 22 may have settings that are zeroed as a reference setting so that the rotating sprayer 20 may be returned to an aligned position during operation of the sprayer 20. Finally, control may pass to a block 120 where the sprayer alignment assembly 40 is removed and the rotating sprayer 20 is replaced on the sprayer positioning assembly 22.

Those skilled in the art will understand that the sprayer alignment assembly 40 and the sprayer alignment routine 100 provide more consistent and accurate alignment of the rotating sprayer 20 with the engine bore 12 than was achievable in previous alignment strategies. The accurate alignment of the rotating sprayer 20 ensures application of an even coating on the concave surfaces of the engine bores 12. The occurrence of hotspots and other flaws in the coating is substantially reduced or eliminated and, correspondingly, the amount of scrap and warranty replacement of defective parts is reduced.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A sprayer alignment assembly for aligning a sprayer rotational axis of a rotating sprayer with a bore longitudinal axis of a concave surface, wherein the rotating sprayer mounts on a sprayer positioning assembly that moves the rotating sprayer relative to the concave surface, the sprayer alignment assembly comprising:
   an elongated alignment base having a first end and an oppositely disposed second end;
   an alignment base connection mechanism disposed at the first end of the elongated alignment base and configured to engage a sprayer positioning assembly connection mechanism and align an alignment base longitudinal axis along the sprayer rotational axis defined by the sprayer positioning assembly; and
   an indicator device disposed at the second end of the elongated alignment base and rotating about the sprayer rotational axis when the elongated alignment base is attached to the sprayer positioning assembly, wherein the indicator device has a visual indicator and a stylus operatively connected to the visual indicator such that a display of the visual indicator changes when the stylus moves relative to a stylus neutral position.

2. The sprayer alignment assembly according to claim 1, wherein the alignment base connection mechanism is the same as a sprayer connection mechanism of the rotating sprayer configured to engage the sprayer positioning assembly connection mechanism and align the rotating sprayer along the sprayer rotational axis.

3. The sprayer alignment assembly according to claim 1, wherein the elongated alignment base has a longitudinal length from the first end to the second end such that a connection point of the indicator device to the second end is approximately at a location of a sprayer output of the rotating sprayer when the rotating sprayer is connected to the sprayer positioning assembly.

4. The sprayer alignment assembly according to claim 1, wherein the elongated alignment base comprises a first base portion having a first base portion outer diameter extending from the first end toward the second end, and a second base portion having a second base portion outer diameter extending from the second toward the first end, wherein the first base portion outer diameter is greater than the second base portion outer diameter.

5. The sprayer alignment assembly according to claim 4, wherein the elongated alignment base comprises an intermediate base portion disposed between the first base portion and the second base portion and having an intermediate base portion outer diameter that is less than the first base portion outer diameter and is greater than the second base portion outer diameter.

6. The sprayer alignment assembly according to claim 1, wherein the visual indicator comprises a dial with a rotatable needle, wherein the rotatable needle is operably connected to the stylus such that the rotatable needle rotates on the dial from a zero position as the stylus displaces from the stylus neutral position.

7. The sprayer alignment assembly according to claim 1, wherein the indicator device comprises an indicator device body having the visual indicator mounted thereon and the stylus pivotally mounted thereto, and a support arm pivotally connected to the indicator device body and configured to attach to the second end of the elongated alignment base and aligned along the sprayer rotational axis so that the indicator device body is rotatable relative to the support arm and the elongated alignment base about a visual indicator device rotational axis that is perpendicular to the sprayer rotational axis.

8. A method for aligning a rotating sprayer with a concave surface, comprising:
   detaching the rotating sprayer from a sprayer positioning assembly;
   attaching a sprayer alignment assembly to the sprayer positioning assembly, wherein the sprayer alignment assembly comprises an indicator device having a visual indicator and a stylus operatively connected to the visual indicator such that a display of the visual indicator changes when the stylus moves relative to a stylus neutral position;
   moving the sprayer positioning assembly to a first longitudinal position relative to the concave surface wherein the stylus of the indicator device is in contact with the concave surface;
   rotating the indicator device about a sprayer rotational axis defined by the sprayer positioning assembly;
   determining whether the display of the visual indicator changes as the indicator device rotates about the sprayer rotational axis due to movement of the stylus relative to the stylus neutral position; and
   changing a position of the sprayer positioning assembly in a direction to more closely align the sprayer rotational axis with a concave surface longitudinal axis in response to determining that the display of the visual indicator changed during rotation of the indicator device about the sprayer rotational axis.

9. The method for aligning the rotating sprayer according to claim 8, comprising moving the indicator device to a second longitudinal position relative to the concave surface in response to determining that the display of the visual indicator did not change during the rotation of the indicator device about the sprayer rotational axis.

10. A method for aligning the rotating sprayer according to claim 8, comprising:
   determining if a current longitudinal position of the indicator device relative to the concave surface is equal to an end longitudinal position relative to the concave surface; and
   withdrawing the indicator device from the concave surface in response to determining that the display of the visual indicator did not change during the rotation of the indicator device about the sprayer rotational axis and that the current longitudinal position of the indicator device is equal to the end longitudinal position.

11. The method for aligning the rotating sprayer according to claim 10, comprising moving the indicator device from the current longitudinal position to a next longitudinal position relative to the concave surface in response to determining that the display of the visual indicator did not change during the rotation of the indicator device about the sprayer rotational axis and that the current longitudinal position of the indicator device is not equal to the end longitudinal position.

12. The method for aligning the rotating sprayer according to claim 8, wherein the display of the visual indicator comprises a dial with a rotatable needle, and the rotatable needle is operably connected to the stylus such that the rotatable needle rotates on the dial from a zero position as the stylus displaces from the stylus neutral position, and wherein determining whether the display of the visual indicator changes comprises determining whether a position of the rotatable needle relative to the zero position changes as the indicator device rotates about the sprayer rotational axis.

13. A method for aligning the rotating sprayer according to claim 8, comprising:
  determining if a current longitudinal position of the indicator device relative to the concave surface is equal to the first longitudinal position relative to the concave surface in response to determining that the display of the visual indicator changed during the rotation of the indicator device about the sprayer rotational axis; and
  moving the sprayer positioning assembly to the first longitudinal position in response to determining that the current longitudinal position of the indicator device is not equal to the first longitudinal position.

14. A sprayer alignment assembly for aligning a sprayer rotational axis of a rotating sprayer with bore longitudinal axis of a concave surface, wherein the rotating sprayer mounts on a sprayer positioning assembly that moves the rotating sprayer relative to the concave surface, the sprayer alignment assembly comprising:
  an elongated alignment base having a first end and an oppositely disposed second end;
  an indicator base connection mechanism disposed at the first end of the elongated alignment base and configured to engage a sprayer positioning assembly connection mechanism and align an alignment base longitudinal axis along the sprayer rotational axis defined by the sprayer positioning assembly; and
  an indicator device disposed at the second end of the elongated alignment base, wherein the indicator device is configured to determine a radial distance between the sprayer rotational axis and the concave surface at multiple positions about the sprayer rotational axis, and to provide a sensory perceptible output of changes in the radial distance at the multiple positions about the sprayer rotational axis.

15. The sprayer alignment assembly according to claim 14, wherein the indicator device is rotatable about the sprayer rotational axis when the elongated alignment base is attached to the sprayer positioning assembly, wherein the indicator device has a visual indicator and a stylus operatively connected to the visual indicator such that a display of the visual indicator changes when the stylus moves relative to a stylus neutral position.

16. The sprayer alignment assembly according to claim 14, wherein the indicator device comprises an indicator device body and a test arm extending from the indicator device body and moveable relative to the indicator device body, wherein the radial distance between the sprayer rotational axis and the concave surface is determine based a position of the test arm relative to the indicator device body.

17. The sprayer alignment assembly according to claim 16, wherein the test arm is rotatably mounted to the indicator device body.

18. The sprayer alignment assembly according to claim 14, wherein the indicator device comprises a visual display and a needle, wherein the needle is configured to move relative to the visual display to provide the sensory perceptible output of changes in the radial distance at the multiple positions about the sprayer rotational axis.

19. The sprayer alignment assembly according to claim 18, wherein the needle rotates on the visual display to provide the sensory perceptible output of changes in the radial distance at the multiple positions about the sprayer rotational axis.

20. The sprayer alignment assembly according to claim 14, wherein the indicator device comprises a dial test indicator comprising an indicator device body, a stylus pivotally mounted to the indicator device body, and a visual indicator mounted on the indicator device body and operatively connected to the stylus such that a display of the visual indicator changes when the stylus rotates relative to a stylus neutral position, wherein the dial test indicator is rotatable about the sprayer rotational axis, and wherein a change in an amount of rotation of the stylus from the stylus neutral position as the dial test indicator rotates about the sprayer rotational axis indicates a change in the radial distance between the sprayer rotational axis and the concave surface.

* * * * *

UNITED STATES PATENT AND TRADEMARK OFFICE
CERTIFICATE OF CORRECTION

PATENT NO. : 9,500,463 B2
APPLICATION NO. : 14/446078
DATED : November 22, 2016
INVENTOR(S) : Killingbeck et al.

Page 1 of 1

It is certified that error appears in the above-identified patent and that said Letters Patent is hereby corrected as shown below:

In the Claims

Column 12, Lines 56-57, In Claim 10, delete "A method for aligning the rotating sprayer according to claim 8," and insert -- The method for aligning the rotating sprayer according to claim 8, --.

Column 13, Lines 21-22, In Claim 13, delete "A method for aligning the rotating sprayer according to claim 8," and insert -- The method for aligning the rotating sprayer according to claim 8, --.

Signed and Sealed this
Second Day of May, 2017

Michelle K. Lee
*Director of the United States Patent and Trademark Office*